United States Patent [19]
Tindley

[11] 3,927,799
[45] Dec. 23, 1975

[54] CUP DISPENSING DEVICE

[75] Inventor: Ronald John Tindley, Uxbridge, Canada

[73] Assignee: Gilron Holdings Limited, Scarborough, Calif., Canada

[22] Filed: Dec. 2, 1974

[21] Appl. No.: 528,704

[52] U.S. Cl. .............................................. 221/223
[51] Int. Cl.[2] ........................................ B65G 59/06
[58] Field of Search ............ 221/223, 251, 225, 238

[56] References Cited
UNITED STATES PATENTS

| | | | |
|---|---|---|---|
| 1,396,995 | 11/1921 | Cooley | 221/223 |
| 3,795,346 | 3/1974 | Roberts et al. | 221/223 |

*Primary Examiner*—Stanley H. Tollberg

[57] ABSTRACT

A dispensing device is provided for dispensing cups, and includes a dispensing tube in which a stack of cups may be placed, and a sliding tongue at the bottom of the dispensing tube on which the stack of cups is supported. When it is desired to dispense a cup, a solenoid is actuated to withdraw the sliding tongue from beneath the bottom end of the dispensing tube, and at the same time to pivot a pivot arm attached to it so as to cause a detent arm to project into the interior of the dispensing tube to engage the outer surface of the beverage cup which was second from the bottom of the stack of cups before the actuation of the solenoid began. The bottom-most cup may then fall from the dispensing tube; or it may be pushed downwardly by one or more stripper arms which are associated with the pivot arm so as to extend into the interior of the dispensing tube and engage the upper rim of the bottom-most cup as the pivot arm moves to engage the detent arm. Upon cessation of actuation of the solenoid, the sliding tongue returns to its position below the bottom end of the dispensing tube and the remaining cups in the dispensing tube move downwardly so as to be supported by the sliding tongue.

10 Claims, 6 Drawing Figures

3,927,799

CUP DISPENSING DEVICE

FIELD OF THE INVENTION

This invention relates to a dispensing device for dispensing beverage cups and the like. More particularly, this invention teaches a dispensing device which is useful for dispensing beverage cups which may be made of paper or such plastics materials as styrofoam.

BACKGROUND OF THE INVENTION

There is a growing demand for vending machines from which various types of beverages — both hot and cold — may be purchased. In particular, there is a growing demand for vending machines for hot beverages including coffee, tea and soups; and it is always desirable to provide such machines in a manner so that the beverage will be fresh when it is consumed. Several different approaches to meeting the demand for such beverage vending machines have been made, including the provision of machines which first dispense a cup then discharge beverage concentrate and water into the cup. A different and newer approach has been to provide vending machines which have stacks of beverage cups into each of which has been pre-packaged a specific beverage concentrate; whereby the beverage cups are dispensed and water is added by the customer at another place or at least at another station on the vending machine.

Because demands are increasing for hot beverages, it is necessary to provide suitable beverage cups for containing the hot beverage and from which the beverage may be drunk, and which may also be held in the hands of the vending machine customer. Thus, it has been found to be desirable to provide plastic cups which are made of a foamed plastic material such as styrofoam, and which have insulating properties. However, those cups are somewhat frangible, particularly around their rim, and they are also extremely light weight when they are empty.

Yet another problem which arises is that greater demand is being made for vending machines which dispense a greater variety of beverages; and it is not uncommon for requirements to be made for a vending machine dispensing eight or 12 different types of beverages. Certain difficulties arise in those machines which first dispense a cup and then discharge beverage concentrate and water into the cup, including the necessity of signalling to a potential customer the fact that the beverage concentrate — or additives such as powdered cream or sugar — for his choice of beverage may be sold out; as well as the physical difficulties of crowding a number of different discharge tubes for a wide variety of beverage concentrates into an area so that all such tubes will discharge into a waiting cup without fail.

As indicated above, a different approach to the provision of vending machines having a plurality of choices of beverages to be purchased therefrom has been to provide prepackaged beverage concentrate in each cup to be dispensed by the vending machine, with the consumer then adding water himself — either at another station on the vending machine, especially for hot water, or elsewhere. In this type of vending machine, it is necessary to provide a number of dispensing devices, one for each variety of beverage to be dispensed from the machine, and to assure the operation of each dispensing device as well as an indication that all of the cups in any one dispensing device have been sold out. In such instances, however, the weight of each cup together with its pre-packaged beverage concentrate may vary widely between different types of beverages. For example, the weight of the pre-packaged beverage concentrate for black coffee would be considerably less than the pre-packaged beverage concentrate for coffee with additional cream and additional sugar. Thus, it is necessary to provide a dispensing device that will dispense a cup no matter what its weight may be.

In any event, it may be desirable in any type of beverage vending machine to use styrofoam beverage cups rather than special paper or injection moulded plastic cups having special rims or the like. Thus, this invention provides a dispensing device which will dispense any type of beverage cup, no matter what its material may be or no matter what its weight may be; by providing detent means which hold up a stack of cups to be dispensed except for the bottom-most cup, the stripper means to strip the bottom-most cup from the stack of cups, if necessary. No special rim is required to be provided, nor any special cam-driven stripper arms to remove and dispense a single cup from a stack of cups. Most of the dispensing devices for beverage cups presently found in the commercial market require special cups and special cam-driven rim-engaging devices.

A dispensing device according to this invention might also be used with chimney-type dispensers in vending machines for such articles as packages of cigarettes and the like, provided that a detent can engage with the second bottom-most article in a stack of articles to be dispensed while the bottom-most article is being dispensed.

BRIEF SUMMARY OF THE INVENTION

It is an object of this invention to provide a dispensing device for dispensing beverage cups and other articles where the bottom-most one of a stack of cups or other articles may be easily dispensed without the requirements for a special co-relating engaging drive means on the dispensing device and on the beverage cup or article to be dispensed.

It is a feature of this invention that the dispensing device provided herein may be arranged to operate with beverage cups or other articles of a particular size, and that it will dispense such cups or other articles one at a time even though the individual weight of each cup or article to be dispensed in one stack thereof may vary from the individual weight of the cups or articles in another stack which will be dispensed from the same dispensing device or from an identical dispensing device.

Yet another feature of this invention is that the operation of the dispensing device may be timed so as to assure that one cup or other article has been dispensed, but also so as to assure a minimum waiting interval between consecutive operations of the device.

BRIEF DESCRIPTION OF THE DRAWINGS

These and other features and objects of the invention are discussed in greater detail hereafter, in association with the accompanying drawings, in which.

DESCRIPTION OF THE PREFERRED EMBODIMENTS

Figure 1:
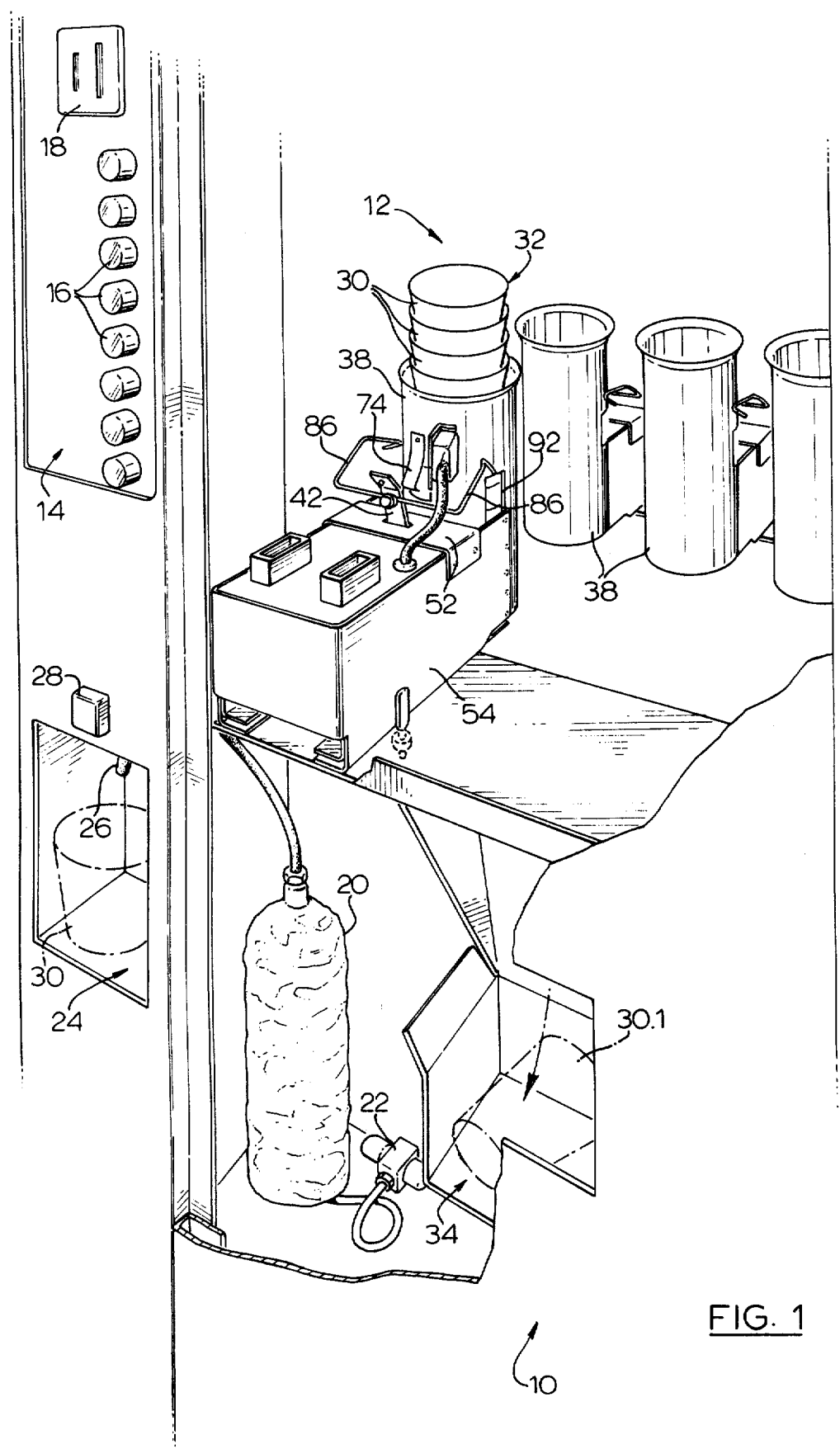
FIG. 1 is a perspective view of portions of a vending machine showing a plurality of dispensing devices according to this invention being used in that vending machine.

In FIG. 1, there is shown some of the principle components of a vending machine from which a variety of beverages of different types may be sold. The vending machine 10 comprises a plurality of dispensing units each indicated generally at 12 — of which four are shown — and each of which is constructed in accordance with this invention as discussed in greater detail hereafter. A selector panel 14 having a plurality of selection buttons 16 and a coin slot 18 is on the face of the vending machine 10. In the lower part of the vending machine is a tank 20 connected to a valve 22, in which water may be heated; and in the machine illustrated, a recess 24 is provided in the front of the machine having a spigot 26 therein and a control button 28 which, when pressed, will cause hot water to be dispensed from the spigot 26 into a cup 30 placed in the recess 24.

Each of the dispensing devices 12 that are installed in the vending machine 10 has a plurality of cups 30 in stacks such as that shown at 32, and as discussed in greater detail hereafter. One of the cups 30.1 is shown to have been dispensed into a receiving chute 34, where it is waiting to be retrieved by the customer who has purchased it. The beverage cup 30.1 has been dispensed from one of the dispensing devices 12; and in the type of vending machine such as the machine 10 contemplated in FIG. 1, each of the beverage cups 30 contains a pre-packaged quantity of beverage concentrate — usually in powder form. Thus, actuation by the customer of any one of the buttons 16 on the panel 14, together with insertion of the appropriate coins in the coin slot 18, will cause one of the dispensing devices 12 to dispense one of the beverage cups, with its pre-packaged beverage concentrate, according to the customer's choice. Appropriate indicators are also provided, of course, in the event that the stack of beverage cups 30 in any one of the dispensers is sold out, so that the customer will know that that particular choice is not available to him.

It should also be noted, and will be discussed in greater detail hereafter, that any of the dispensing devices 12 which are shown in FIG. 1 as being particularly adapted for use with beverage cups, may be replaced by similar dispensing devices which can be adapted for use with such articles as cigarette packages, packaged candy and the like. The operation of any such dispensing device would be substantially similar to the operation of the dispensing devices 12 when used with beverage cups, and as discussed in greater detail hereafter.

Figure 2:
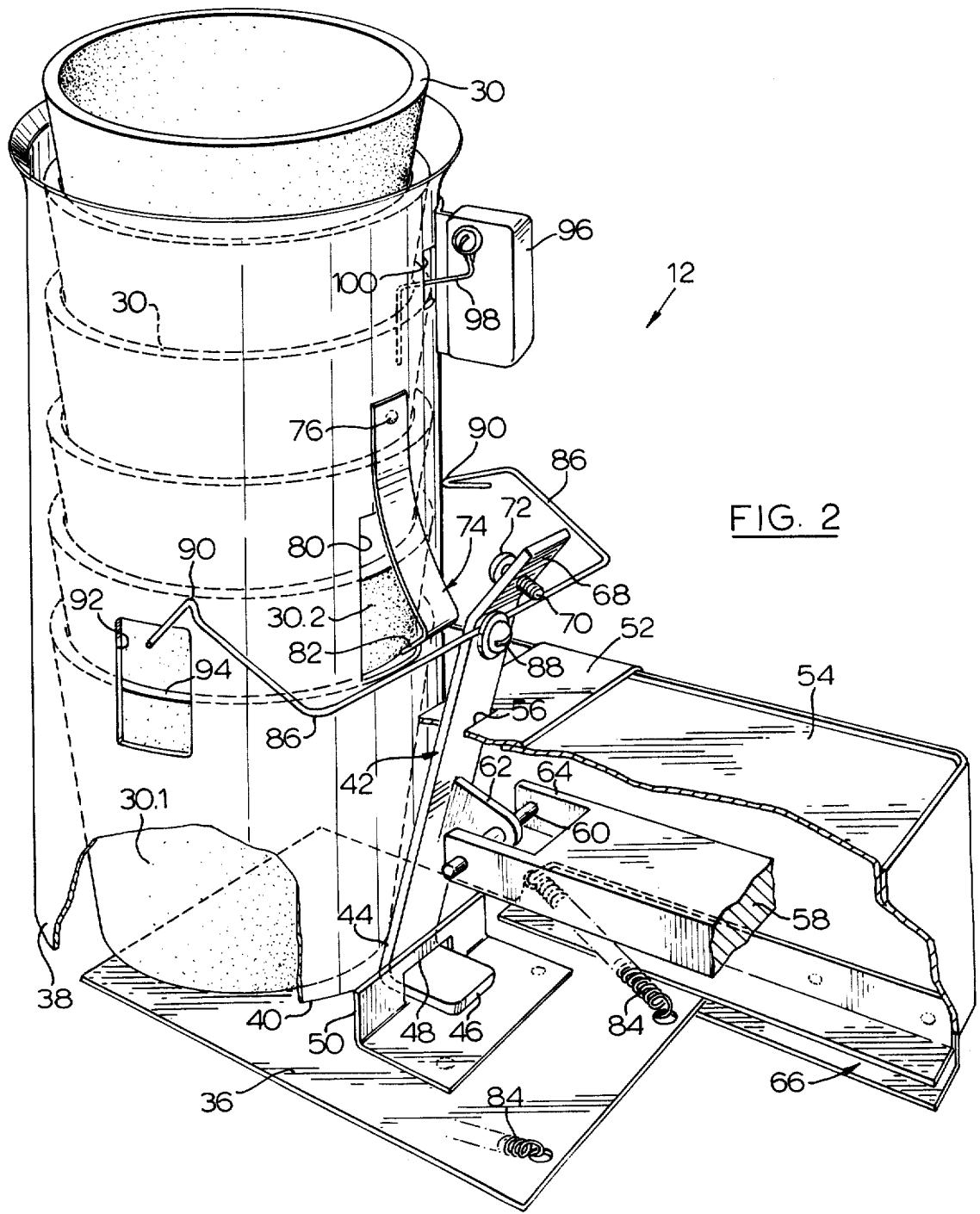
FIG. 2 is a perspective, partially cut-away view of a dispensing device according to this invention, showing the principle operating components thereof.

Turning now to FIG. 2, it will be noted that the dispensing device illustrated therein includes a sliding tongue 36 which is adapted to move from a first position to a second position, and a dispensing tube 38 which is open at both ends. In the dispensing device 12 shown in FIG. 2, the dispensing tube 38 is adapted to accommodate a plurality of stacked beverage cups 30; but the dispensing tube may be re-dimensioned and the other components which cooperate with it may be re-arranged so that the dispensing tube will operate with other articles than beverage cups. However, it is particularly with respect to beverage cups — and most especially beverage cups of the type which are formed from styrofoam or other expanded polystyrene beads and the like — to which the present discussion is particularly directed.

The sliding tongue 36 is arranged to underlie at least a portion of the bottom end 40 of the dispensing tube 38 when the tongue 36 is in its first position. Also, when the sliding tongue 36 is in its second position as discussed hereafter, it is substantially clear from the bottom end 40 of the dispensing tube 38. As can be seen from the drawing, the direction of sliding motion of the sliding tongue 36 is substantially perpendicular to the axis of the dispensing tube 38.

A pivot arm 42 is provided, and it is attached at its lower end 44 to the sliding tongue 36. The attachment of the pivot arm 42 to the sliding tongue 36 is simply by virtue of a tab 46 extending through a slot 48 in a bracket 50 which is secured to the upper surface of the sliding tongue 36. The pivot arm 42 extends through a pivot bracket 52 which is secured to a housing 54. The pivot arm 42 extends through slot 56 formed in the pivot bracket 52, and pivots about either the front or back edge of the slot 56 depending on the direction of pivoting motion, as discussed in greater detail hereafter.

A solenoid is enclosed within the housing 54, but for the sake of clarity it is not shown in FIG. 2. However, the solenoid has a solenoid arm 58 which is secured to the pivot arm by a pin 60 passing through plate 62 on the pivot arm 42, and secured in extension 64 of the solenoid arm 58. Thus, the pivot arm 42 is adapted to pivot about an edge of slot 56 in the pivot bracket 52 upon movement of the pivot arm 58; and for consistency of terminology, it will be stated that the first position of the pivot arm 42 is as shown in FIG. 2 where the bottom end 44 of the pivot arm 42 is extended fowardly towards the bottom end 40 of the dispensing tube 38, and of course where the sliding tongue 36 is in its first position.

Obviously, if the solenoid is actuated so as to withdraw the solenoid arm 58 to the right as shown in FIG. 2 (and as discussed hereafter with reference to FIG. 4), the pivot arm 42 is caused to pivot about the forward edge of the slot 56 and the bottom end 44 of the pivot arm 42 is pulled to the right. Thus, because of the cooperation between the bottom 44 of the pivot arm 42 and the bracket 50 on the sliding tongue 36, the tongue is pulled to the right. The side edges of the sliding tongue 36 may be accommodated in opposed, horizontally facing channels 66, one of which is shown on the right hand side of the dispensing device 12 in FIG. 2.

So long as the solenoid arm 58 is retained withdrawn to the right from the position illustrated in FIG. 2 — i.e., so long as the solenoid remains actuated — the sliding tongue 36 will be maintained in its second position to the right, away from the bottom 40 of the dispensing tube 38.

The upper end 68 of the pivot arm 42 may have a slight backwards slant formed in it, and means such as a bolt 70 may be placed in the upper portion 68 of the pivot arm 42. The head 72 of the bolt 70, in this instance, is adapted to contact and push against the outer surface of a detent arm 74 which is secured such as by rivet 76 to the dispensing tube 38. The detent arm 74 is adapted to extend through an opening 80 which is formed in the side of the dispensing tube 38 upon interference therewith by the upper end of the pivot arm 42 as the pivot arm moves towards its second position. Thus, the head 72 of the bolt 70 contacts the outer surface of the detent arm 74 and forces the lower end 82 of the detent arm 74 through the opening 80 into the interior of the dispensing tube 38. The dimensions of the pivot arm 42, the detent arm 74 and the amount of pivoting of the pivot arm 42 due to the action of the solenoid arm 58 are all such that when the pivot arm 42 moves to its second position, the lower end 82 of the detent arm 74 engages the outer surface of the beverage cup indicated at 30.2 which is the beverage cup which was second from the bottom of the stack 32 of the beverage cups immediately before the solenoid was actuated so as to withdraw solenoid arm 58 to the right.

The detent arm 74 is biased outwardly from the interior of the dispensing tube 38, so that when the upper end of the pivot arm 42 is not interfering with the detent arm 74, the lower end 82 of the detent arm 74 does not engage the outer surface of any beverage cup or other article within the dispensing tube 38. Thus, the detent arm 74 is conveniently made of spring steel.

When actuation of the solenoid ceases, and the solenoid arm 58 is permitted to move again to the left to its first position as illustrated in FIG. 2, it is desirable to have the sliding tongue 36 return to its first position as quickly as possible, for purposes discussed hereafter. In any event, the solenoid may be such that it has a return spring in it to force the solenoid arm 58 to the left upon cessation of its actuation; but in the more usual case, return springs 84 are provided to cause the sliding tongue 36 to return to its first position as quickly as possible. The springs 84 are secured at one end to the housing 54 and at the other end to the sliding tongue 36. As the sliding tongue 36 is returned to its first position, interference of the bracket 50 with the lower end 44 of the pivot arm 42 will cause the pivot arm 42 to return to its first position notwithstanding any action by or against the solenoid arm 58.

When the sliding tongue 36 is withdrawn to its second position, and the pivot arm 42 is pivoted to its second position so that the lower end 82 of the detent arm 74 interferes with the outer surface of the second to the bottom beverage cup 30.2, the bottom-most beverage cup 30.1 may fall as a consequence of gravity acting upon it away from the next to the bottom cup 30.2. However, if the cups are stacked so that there may be friction or elastic forces between the interior of the cup 30.1 and the outer surface of the cup 30.2 — or indeed, electrostatic attraction — stripper arms 86 are provided to push the bottom-most cup 30.1 downwardly away from the next cup 30.2. The pusher arms 86 — or at least one of them — are secured such as by bolt 88 to the pivot arm 42; and the stripper arms 86 are formed with a portion 90 which is adapted to extend far enough through openings 92 formed in the side of the dispensing tube 38 so as to interfere with the upper rim 94 of the cup 30.1. Obviously, as the pivot arm 42 moves towards its second position, the portions 90 of the stripper arms 86 move downwardly against the upper rim 94 of the bottom-most cup 30.1, and push the cup 30.1 downwards away from the next cup 30.2. A single stripper arm 86 may suffice, but usually a pair of stripper arms 86 is provided. If the article being dispensed is not a beverage cup but rather such as a package of cigarettes, it may not be necessary that the stripper arms 86 be provided at all, because there is less likelihood that the bottom-most article will be retained upwardly by friction or electrostatic attraction forces when the sliding tongue 36 which supports it has been removed from its supporting position.

Figure 3:
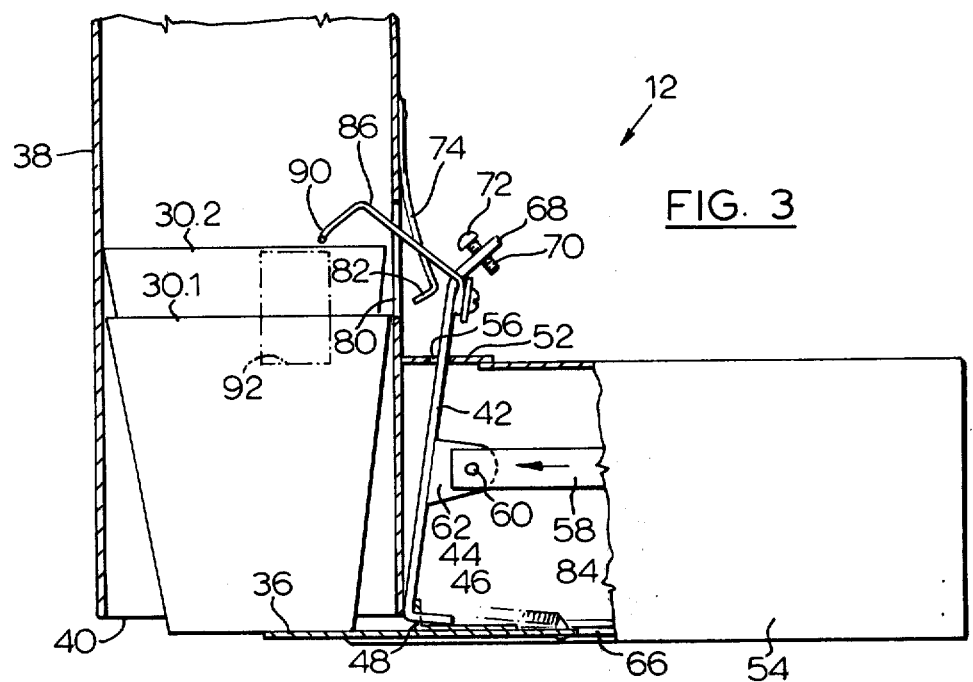
FIGS. 3, 4 and 5 are sequential views taken in cross-section through a dispensing device according to this invention, showing its operation in dispensing a single beverage cup, and FIG. 6, which is found with FIG. 2, is a block circuit diagram of the electrical circuit arrangement for a dispensing device according to this invention.
Figure 4:
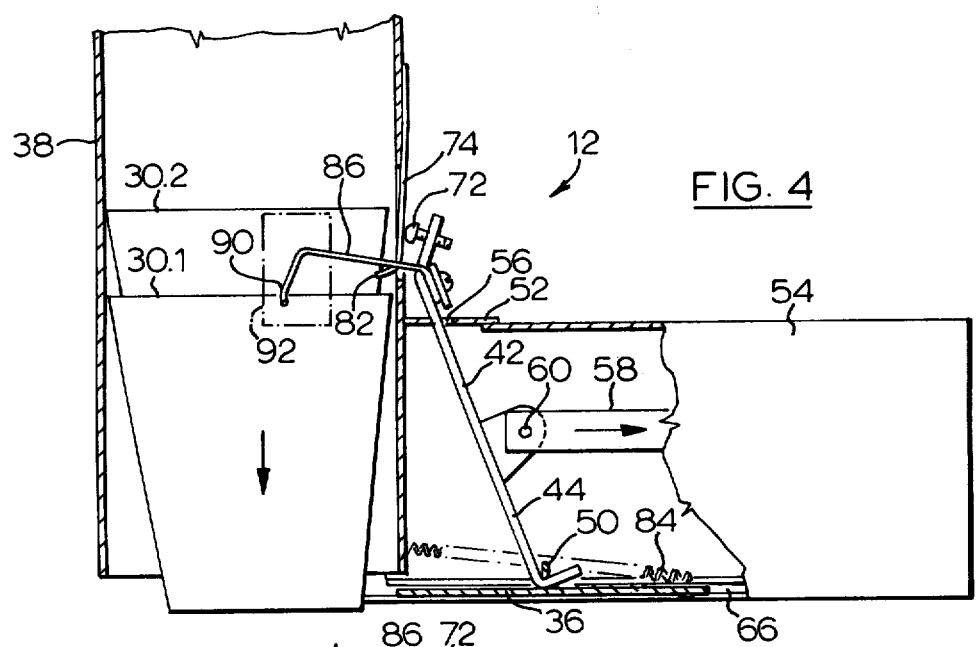
Figure 5:
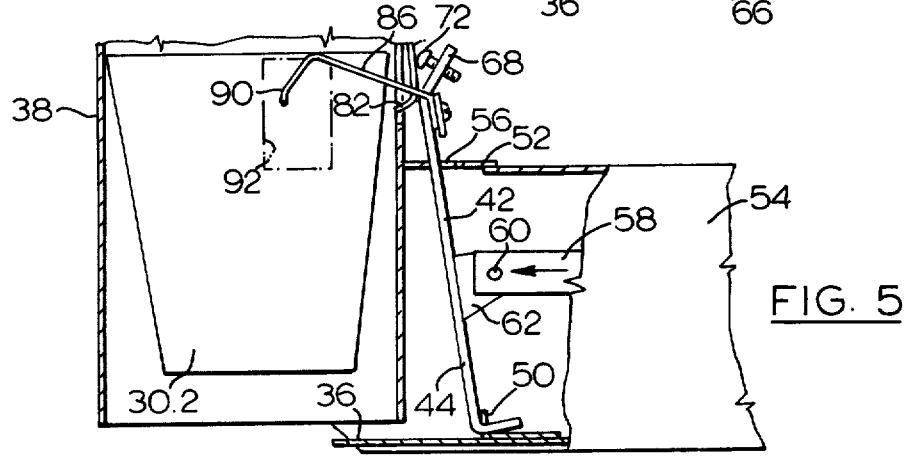

Turning now to FIGS. 3, 4 and 5, the operation of a dispensing device 12 as so far described may be easily explained. Two beverage cups 30.1 and 30.2 which are the bottom-most two of a stack of beverage cups placed in dispensing tube 38 are shown in FIG. 3, and they are supported at their bottom upon the sliding tongue 36. In FIG. 3, the solenoid arm 58 is in its normal position, extended to the left, so that the sliding tongue 36 and pivot arm 42 are each in their respective first position as discussed above. When the solenoid is actuated so that the solenoid arm 58 withdraws to the right, as in FIG. 4, the pivot arm 42 pivots about the front edge of the slot 56 and the head 72 of bolt 70 contacts the outer surface of the detent arm 74. This forces the detent arm inwardly so that the bottom end 82 thereof engages the outer surface of the cup 30.2. At the same time, the sliding tongue 36 is withdrawn to its second position — to the right — so that the bottom-most beverage cup 30.1 is unsupported whereas the next beverage cup 30.2 and all of those above them are precluded from downward movement through the dispensing tube 38 because of the engagement of the lower end 82 of the detent arm 74 with the outer surface of the beverage cup 30.2. Indeed, when the beverage cups are formed of such material as expanded polystyrene beads, the lower end 82 of the detent arm 74 causes a slight depression in the outer surface of the cup 30.2.

As noted above, if the bottom-most cup 30.1 has not released from the beverage cup 30.2 and fallen under the influence of gravity away from it, the stripper arms 86 engage the upper rim 94 of the cup 30.1 at portion 90 of the stripper arms, and because of the pivoting motion to the left of the upper portion of the pivot arm 42 as the solenoid arm 58 withdraws to the right, the portion 90 of the stripper arm 86 pushes downwardly against the upper rim 94 of the beverage cup 30.1 and pushes it away from any engagement with cup 30.2. Thereafter, the beverage cup 30.1 falls under the influence of gravity out of the dispensing tube 38 — and into the receiving chute 34 illustrated in FIG. 1. It is necessary that the solenoid arm 58 be retained for sufficient period of time that the beverage cup 30.1 is allowed to fall free from the dispensing tube 38 before the sliding tongue 36 returns to its first position. When the actuation of the solenoid is stopped, however, return springs 84 immediately draw the sliding tongue 36 to its first position; and the sliding tongue 36 moves into supporting relationship below the bottom end 40 of the dispensing tube 38 before the detent arm 74 has disenaged with the new bottom-most beverage cup 30.2 and that cup has had a chance to move downward. Thus, when the bottom-most cup 30.2 in FIG. 5 does move downwardly, it engages the upper surface of the sliding tongue 36 which is already in place or moving towards its first position where it supports the beverage cup 30.2 and all others in the same stack 32.

Obviously, because the vending machine 10 is normally closed and locked, all of the beverage cups 30 in any given stack 32 in any given dispensing device 12 may be purchased before additional cups can be added to the stack. In other words, that selection becomes sold out. It is necessary, however, to provide means whereby an indication is given to a potential customer of the vending machine that any given selection is sold out; and as well to preclude operation of the dispensing device when there is nothing in the dispensing tube thereof to be dispensed. Therefore, a "sold out" circuit is provided, including a switch means 96 having a sensing arm 98 which extends through an opening 100 in the side of the dispensing tube 38 above opening 80 through which the detent arm 74 extends. The switch 96 remains closed so long as there is a cup or other article in the dispensing tube 38 to engage the sensing arm 98. However, when there are no longer sufficient beverage cups or other articles in the dispensing tube 38 to contact the sensing arm 98, the switch 96 opens and a "sold out" visible indication is made on the selection panel 14 and further actuation of the solenoid is precluded, as discussed in greater detail hereafter with reference to FIG. 6. In fact, there may be two or three beverage cups or other articles remaining in the dispensing tube 38 when the switch 96 opens to indicate that the selection is sold out, but it would normally be anticipated that service by the owner of the vending machine would be promptly undertaken.

Turning now to FIG. 6, a block circuit diagram is shown for a dispensing device according to this invention. In order for the dispensing device to work, a pre-condition gate 102 must first be placed in operative condition by a customer of the vending machine 10. This is accomplished, of course, by depositing the appropriate coins in coin slot 18. When the pre-condition gate 102 is rendered operative, power from the line is supplied to the selector switch array 104 which comprises a plurality of selector switches 16 as shown in FIG. 1. A number of outputs 105 are shown from the selector switch array 104, and each of those outputs 105 connects to an individual relay 106 which is associated with one dispensing device 12 within the cabinet of the vending machine 10. Each relay 106, in turn, is in series with a solenoid 108 whose solenoid arm 58 is connected to the pivot arm 42 as discussed above. Thus, operation of the selector switch array 104 connects power to a single relay 106 and to its associated solenoid 108, thereby causing operation of the dispensing device 12 which will dispense a beverage cup or other article according to the customers selection. A time delay circuit 110 is also associated with solenoid 108, and provides a means of adjusting the period of time for which the solenoid 108 remains actuated so that the solenoid arm 58 is withdrawn to its second position. The optimum period of time for actuation of the solenoid 108 may therefore be achieved by adjustment of time delay circuit 110; while at the same time assuring that the solenoid 108 remains actuated for sufficient length of time that the bottom-most beverage cup or other article in the dispensing device is indeed dispensed and is clear of the dispensing tube 38 thereof.

In the event that the stack of beverage cups or other articles in a dispensing device 12 is sold out, as discussed above, a sold out circuit 112 which includes the switch 96 operates to cause a sold out indication on the selector board 14 or elsewhere; and as well to preclude operation of the solenoid 108. This may be accomplished by including in the sold out circuit 112 means to provide the actual operating power to the solenoid 108 so that the relay 106 pre-conditions the solenoid and the power for its operation is provided through the sold out circuit. Thus, the selector switches, relays 106, etc., may be low current devices whereas the means provided in the sold out circuit 112 to operate the solenoid and maintain its actuation for a predetermined period of time as accommodated by the time delay circuit 110 may be high current components.

A dispensing device has been described which is particularly suitable for dispensing beverage cups or other articles, without the necessity for any special co-relation between a part of the cup or other article to be dispensed and an operating part of the dispensing device. Stripper arms have been disclosed which assist to dispense the bottom-most beverage cup from a stack of beverage cups if the cup does not fall free under the influence of gravity, but the stripper arms merely contact the upper rim of the cup which would, in any event, be outstanding from the outer surface of the cup which is immediately above the cup to be dispensed. Thus, no special cup arrangement is required.

Likewise, if the articles to be dispensed are such as candy bars or cigarette packages, it may not be necessary to provide stripper arms, although a detent arm would be provided to preclude downward movement of the second bottom-most article during the time that the sliding tongue at the bottom of the dispensing tube is out of its first, supporting position and the bottom-most article is being dispensed.

Other changes, modifications or alterations to the dispensing device according to this invention may be made without departing from the spirit and scope of the appended claims.

The embodiments of the invention in which an exclusive property or privilege is claimed are defined as follows:

1. A dispensing device for dispensing articles such as beverage cups and the like, comprising:

a sliding tongue adapted to move from a first position to a second position;

a dispensing tube open at both ends and adapted to accommodate a plurality of stacked articles; said sliding tongue being arranged to underlie at least a portion of the bottom end of said dispensing tube when said tongue is in its first position, and to be substantially clear from the bottom end of said dispensing tube when said tongue is in its second position; the direction of sliding motion of said tongue being substantially perpendicular to the axis of said dispensing tube;

a pivot arm attached at its lower end to said sliding tongue, and arranged to extend through a slot formed in a pivot bracket so as to pivot about an edge of said slot;

a solenoid having a solenoid arm connected to said pivot arm and adapted to pivot said pivot arm from a first position to a second position upon actuation of said solenoid, and to retain said pivot arm in said second position for as long as said solenoid remains actuated; said first position of said pivot arm being when said sliding tongue is in its first position;

a detent arm adapted to extend through an opening in the side of said dispensing tube upon interference therewith by the upper end of said pivot arm as said pivot arm moves towards its second position, so that when said pivot arm is in its second position said detent arm extends into said dispensing tube to engage the outer surface of the article therein which was second from the bottom before actuation of said solenoid began; said detent arm being biased outwardly so as not to engage the outer surface of any cup in said dispensing tube except when interfered with by said pivot arm;

said pivot arm being arranged to move said sliding tongue from its first position to its second position when said arm is pivoted from its respective first position to its second position upon actuation of said solenoid and movement of said solenoid arm;

and means for causing the return of said sliding tongue from its second position to its first position when actuation of said solenoid is completed, and also to cause return of said pivot arm from its second position to its first position, 2. The dispensing device of claim 1 where said means for causing the return of said sliding tongue from its second position to its first position is a spring secured to said tongue and biased to cause motion thereof towards said first position.

3. The dispensing device of claim 1 where said means for causing the return of said sliding tongue from its second position to its first position is a return means on said solenoid arm to force movement thereof to its first position when actuation of said solenoid is completed.

4. The dispensing device of claim 1, further including at least one stripper arm secured to the upper portion of said pivot arm and adapted to extend into said dispensing tube through an opening in the side thereof; said at least one stripper arm being arranged to interfere with a portion of the bottom-most article in said dispensing tube, and to push downwards thereagainst, as said pivot arm moves towards its second position.

5. The dispensing device of claim 4 including a pair of stripper arms secured to said pivot arm so as to extent into said dispensing tube through two, spaced apart openings in the side thereof.

6. The dispensing device of claim 1, further including switch means having a sensing arm extending into said dispensing tube above the place where said detent arm extends into said dispensing tube, to sense the presence or absence of an article in said dispensing tube at said sensing arm.

7. The dispensing device of claim 1 where a time delay circuit is associated with said solenoid so as to continue the actuation of said solenoid — and thereby to retain said sliding tongue and said pivot arm in their respective second positions — for a predetermined period of time.

8. The dispensing device of claim 4 where, when said article in said dispensing tube are beverage cups, said at least one stripper arm is arranged to interfere with the upper rim of the bottom-most beverage cup.

9. A dispensing device for dispensing articles such as beverage cups and the like, comprising:

a sliding tongue adapted to move from a first position to a second position;

a dispending tube open at both ends and adapted to accommodate a plurality of stacked articles, said sliding tongue being arranged to underlie at least a portion of the bottom end of said dispensing tube when said tongue is in its first position, and to be substantially clear from the bottom end of said dispensing tube when said tongue is in its second position, the direction of sliding motion of said tongue being substantially perpendicular to the axis of the said dispensing tube;

a pivot arm pivotally attached at its lower end to said sliding tongue;

actuating means connected to said pivot arm and adapted to pivot said pivot arm from a first position to a second position, and to retain said pivot arm in said second position for as long as said means remains actuated, said first position of said pivot arm being when said sliding tongue is in its first position;

a detent arm adapted to extend through an opening in the side of said dispensing tube upon interference therewith by the upper end of said pivot arm as said pivot arm moves towards its second position, so that when said pivot arm is in its second position said detent arm extends into said dispensing tube to engage the outer surface of the article therein which was second from the bottom before actuation of said actuating means began, said detent arm being biased outwardly so as not to engage the outer surface of any cup in said dispensing tube except when interfered with by said pivot arm;

said pivot arm being arranged to move said sliding tongue from its first position to its second position when said arm is pivoted from its respective first position to its second position upon actuation of said actuating means;

means for causing the return of said sliding tongue from its second position to its first position when actuation of said actuating means is completed, and also to cause return of said pivot arm from its second position to its first position.

10. The dispensing device of claim 9, further including at least one stripper arm secured to the upper portion of said pivot arm and adapted to extend into said dispensing tube through an opening in the side thereof, said at least one stripper arm being arranged to interfere with a portion of the bottom-most article in said dispensing tube, and to push downwards thereagainst, as said pivot arm moves toward its second position.

* * * * *